US008090146B2

(12) United States Patent
Seshadri et al.

(10) Patent No.: US 8,090,146 B2
(45) Date of Patent: Jan. 3, 2012

(54) IMAGE WATERMARKING

(75) Inventors: Vivek Seshadri, Chennai (IN); Kiran Singh Panesar, Karnataka (IN); Ranveer Kunal, Tamil Nadu (IN)

(73) Assignee: Google Inc., Mountain View, CA (US)

( * ) Notice: Subject to any disclaimer, the term of this patent is extended or adjusted under 35 U.S.C. 154(b) by 596 days.

(21) Appl. No.: 12/354,534

(22) Filed: Jan. 15, 2009

(65) Prior Publication Data

US 2010/0177977 A1    Jul. 15, 2010

(51) Int. Cl.
*G06K 9/00* (2006.01)
*H04L 9/32* (2006.01)

(52) U.S. Cl. .................... 382/100; 382/250; 713/176

(58) Field of Classification Search .............. 382/100, 382/106, 107, 112, 155, 162, 168, 173, 181, 382/232, 233, 243, 250, 274, 276, 280, 284, 382/287–295, 305, 312; 713/180, 176; 375/240.19
See application file for complete search history.

(56) References Cited

U.S. PATENT DOCUMENTS

| | | | |
|---|---|---|---|
| 6,693,965 B1 * | 2/2004 | Inoue et al. | 375/240.19 |
| 7,240,210 B2 * | 7/2007 | Mihcak et al. | 713/180 |
| 7,360,093 B2 * | 4/2008 | de Queiroz | 713/176 |
| 7,707,425 B2 * | 4/2010 | Mihcak et al. | 713/180 |
| 8,036,419 B2 * | 10/2011 | Rhoads et al. | 382/100 |
| 2003/0202678 A1 * | 10/2003 | Silverstein | 382/100 |
| 2004/0101160 A1 * | 5/2004 | Kunisa | 382/100 |

FOREIGN PATENT DOCUMENTS

| | | |
|---|---|---|
| WO | WO 01/24113 A1 | 4/2001 |
| WO | WO 2007/003008 A1 | 1/2007 |

OTHER PUBLICATIONS

International Search Report cited in International Application No. PCT/US2010/021187, International filing date Jan. 15, 2010.
The Written Opinion of the International Searching Authority cited in International Application No. PCT/US2010/021187, International filing date Jan. 15, 2010.
Hartung et al., "Multimedia Watermarking Techniques," Proceedings of the IEEE, vol. 87, No. 7, Jul. 1999, pp. 1079-1107.
Wen-Nung Lie et al., "Robust Image Watermarking on the DCT Domain", IEEE International Symposium on Circuits and Systems, May 28-31, 2000, pp. 228-231.
Andrew B. Watson, "Image Compression Using the Discrete Cosine Transform", Mathematica Journal 4(1), 1994, p. 81-88.

* cited by examiner

*Primary Examiner* — Seyed Azarian
(74) *Attorney, Agent, or Firm* — Sterne, Kessler, Goldstein & Fox P.L.L.C.

(57) ABSTRACT

Methods and systems for watermarking of digital images are presented. In one aspect, a method of embedding information in a digital image includes transforming the digital image to a set of coefficient blocks having coefficients in a frequency domain, embedding a watermark-indicator in one or more of the coefficient blocks, and embedding a watermark in one or more watermark blocks that have a predetermined number of coefficient blocks. The embedded watermark is substantially invisible in the output watermarked digital image. Another aspect is a method of extracting a watermark from a digital image that includes transforming a digital image to a coefficient matrix, determining if the digital image is watermarked based on a predetermined watermark-indicator, and retrieving a watermark from a projected watermark block of a projected watermark block distribution.

18 Claims, 10 Drawing Sheets

IMAGE WATERMARKING

BACKGROUND

1. Field

This invention relates to watermarking of digital images.

2. Background Art

Digital imaging allows images to be represented with digital data. With the growth in availability and access to the World Wide Web (WWW) and the widespread availability of digital imaging technology, the number of digital images and the frequency of their use has grown. Many applications provide accessibility to particular digital images or image collections to a large number of different users for purposes such as viewing, editing, or sharing. For instance, digital images of persons, animals, objects, and scenery, are often posted on the WWW by owners of those images with the intent of sharing the images with a select group of people or the public at large.

However, the accessibility of these digital images on the WWW makes it easier for others to copy and use them for unauthorized purposes. For example, a member of Google's Orkut social networking community may post an image to identify himself as the owner of material posted on his blog. Another person may copy this image and post it elsewhere purporting to be his own. Many examples exist, such as above, where digital images can be copied and used by persons other than the rightful owners.

One technique used to reduce unauthorized copying of images, is the technique of watermarking. The watermarking of a digital image includes the embedding of a digital watermark (referred to simply as a "watermark") in that image. The watermark can be a digital signature, a user identifier, a logo, or similar value that can sufficiently identify the image as to its origin or ownership. It is highly desirable that the embedded watermark does not alter the appearance of the original image, i.e., the watermark should be substantially invisible to the human eye. The watermark perceivably alters the appearance of the original image in many of the conventional watermarking methods.

Digital images are generally posted on the WWW in a compressed form, such as, the Joint Photographic Experts Group (JPEG or JPG) compression format or other type of image compression format. Because image compression methods alter the values of selected image pixels, it is possible that the embedded watermark is affected in such a way as to alter the appearance of the image and/or to make the watermark unrecoverable. Therefore, it is also desired that a watermark be robust to survive high levels of compression, such as JPEG 60 or JPEG 80 compression.

Often, a person copying a digital image also engages in altering the image, for example, by cropping the original image. In order to be effective, an embedded watermark should also be detectable and/or retrievable from a copied image after such cropping has taken place.

Many approaches to digital watermarking have been proposed. For example, one approach involves the generation of a discrete courier transform (DCT) coefficient matrix (DCT matrix) for the image, dividing the coefficient matrix into one or more watermark blocks, and embedding a digital signature in each of the watermark blocks. Wen-Nung Lie, Guo-Shiang Lin, Chih-Liang Wu, and Ta-Chun Wang, "Robust Image Watermarking On the DCT Domain," IEEE International Symposium on Circuits and Systems, Geneva, (2000), describes such an approach. The method described by Lie et al. embeds a watermark repetitively in different sections of an image in the corresponding DCT matrix. However, this method is vulnerable to cropping and is computationally expensive. For example, cropping a watermarked image having a watermark embedded using the Lin et. al. method, can prevent the cropped image from being recognized as a watermarked image. Also, the method described by Lie et. al., incurs a relatively high cost of computation by requiring identification of a substantial part of the originally embedded watermark in order to determine that the image was watermarked.

Therefore, improved methods and systems for watermarking of digital images are needed.

BRIEF SUMMARY

Methods and systems for watermarking of digital images are presented. One embodiment is a method of embedding information in a digital image to create a watermarked digital image. The method includes transforming the digital image to multiple coefficient blocks of coefficients in a frequency domain, embedding a watermark-indicator in each of the coefficient blocks, embedding a watermark in each of the watermark blocks to generate a watermarked digital image, and outputting the watermarked digital image.

Another embodiment is a method of extracting a watermark from a digital image. The method includes transforming the digital image to a coefficient matrix having coefficients in a frequency domain, determining if the digital image is watermarked based on a predetermined watermark-indicator coefficient set in each coefficient block in a projected coefficient block distribution, and retrieving a watermark from a projected watermark block of a projected watermark block distribution. The projected watermark block distribution is based on the projected coefficient block distribution.

Yet another embodiment is a system for watermarking a digital image. The system includes a processor, a memory, an image transform module, and a watermark embedding module. The image transform module is configured to transform the digital image to a plurality of coefficient blocks of coefficients in a frequency domain. The watermark embedding module is configured to embed a watermark in each of a plurality of watermark blocks to generate a watermarked digital image. The watermark-indicator embedding module is configured to embed a watermark-indicator in each of a plurality of said coefficient blocks.

A further embodiment is a system for extracting a watermark from a digital image, having a processor, a memory, an image transform module, a watermark-indicator detection module, and a watermark extractor module. The image transform module is configured to transform the digital image to a plurality of coefficient blocks of coefficients in a frequency domain. The watermark-indicator detection module is configured to determine if the digital image is watermarked based on a predetermined watermark-indicator coefficient set in each coefficient block in a projected coefficient block distribution. The watermark extractor module is further configured to retrieve a watermark from a projected watermark block of a projected watermark block distribution. The projected watermark block distribution is based on the projected coefficient block distribution.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

A watermark in a digital image can be used to identify the image and also any digital copies of that image. A watermark can include any identifying criteria as to the origin and/or ownership of that image. For example, digital signatures, user identifiers, logos, codes, etc., are some types of watermarks that are used in digital images.

Watermarks can be used in digital images in a variety of applications to help identify the origin or ownership of a digital image and to help reduce unauthorized use of digital images. One example environment in which embodiments of the present invention can be used includes reducing the unauthorized copying and posting of images on the WWW. For example, embodiments of the present invention may enable the embedding of a watermark comprising the user identifier of the original poster in photographs posted on PICASA or on ORKUT, both web-based services offered by Google of Mountain View, Calif. Whenever a watermarked image is copied and posted elsewhere, embodiments of the present invention can allow any concerned entity to determine if that image was watermarked and if so retrieve the embedded watermark. The knowledge that a posted image is already watermarked permits a determination as to its authenticity. The retrieval of the actual embedded watermark permits the image to be tracked to its source.

In embodiments of the present invention, methods and systems for watermarking of digital images are presented. Example embodiments include a method of embedding information in a digital image to create a watermarked digital image, a method of extracting a watermark from a digital image, and a system for watermarking a digital image. One method of creating a watermarked digital image includes transforming a digital image to multiple coefficient blocks of coefficients in a frequency domain, embedding a watermark-indicator in each of the coefficient blocks, embedding a watermark in each of the watermark blocks to generate a watermarked digital image, and outputting a watermarked digital image. A method of extracting a watermark includes transforming the digital image to a coefficient matrix having coefficients in a frequency domain, determining if the digital image is watermarked based on a predetermined watermark-indicator coefficient set in each coefficient block in a projected coefficient block distribution, and retrieving a watermark from a projected watermark block of a projected watermark block distribution. The projected watermark block distribution is based on the projected coefficient block distribution.

Several advantages may be obtained in embodiments. Embodiments of the present invention may duplicate watermark data over an image and also spread each instance of a watermark over a defined area in order to achieve increased robustness to compression and cropping. Out-of-order recovery of watermark data elements may be done in embodiments. Further, strengthening robustness of watermarking against cropping and compression may be obtained. By separating detection from extraction of the watermark, embodiments of the present invention may remarkably increase the computational efficiency of the process and also enhance robustness. For example, embodiments of the present invention can allow the detection of a watermark to a very high degree of compression and/or cropping, and the extraction of an embedded watermark also to a high degree of compression and/or cropping. Embodiments of the present invention may also embed watermarks that are substantially invisible to the human eye and therefore do not perceivably distort the original image.

In embodiments, watermarking is provided that may be practical, computationally efficient for use in environments with a large number of images to be processed, and robust to compression and cropping to be a effective tool in reducing the misuse of digital images in environments including the WWW.

Embedding a Watermark

Figure 1:
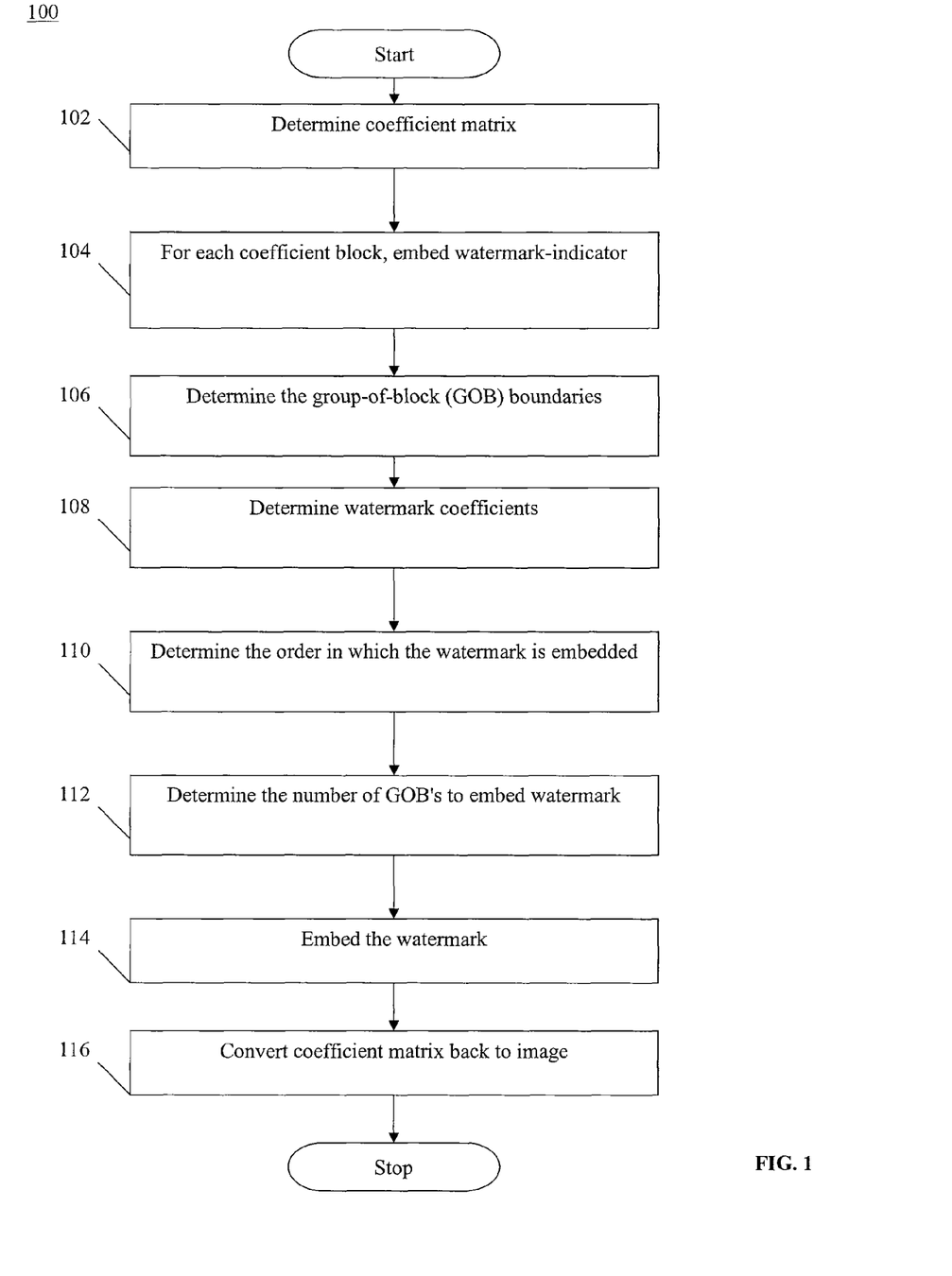
FIG. 1 is a flowchart of a method of embedding watermarks in digital images, according to an embodiment of the present invention.

FIG. 1 illustrates a process 100 to embed a watermark in a digital image, according to an embodiment of the present invention (steps 102-116). In step 102, the image is transformed into a representative numerical coefficient matrix, for example, a matrix of coefficients in the discrete cosine transform (DCT) domain. The matrix of coefficients is referred to hereafter interchangeably as "coefficient matrix" or "DCT matrix." The description herein is based on coefficients in the DCT domain. However, other transformations in the frequency domain that yield coefficient matrices corresponding to a digital image are possible, and are contemplated within embodiments of the present invention.

Figure 2:
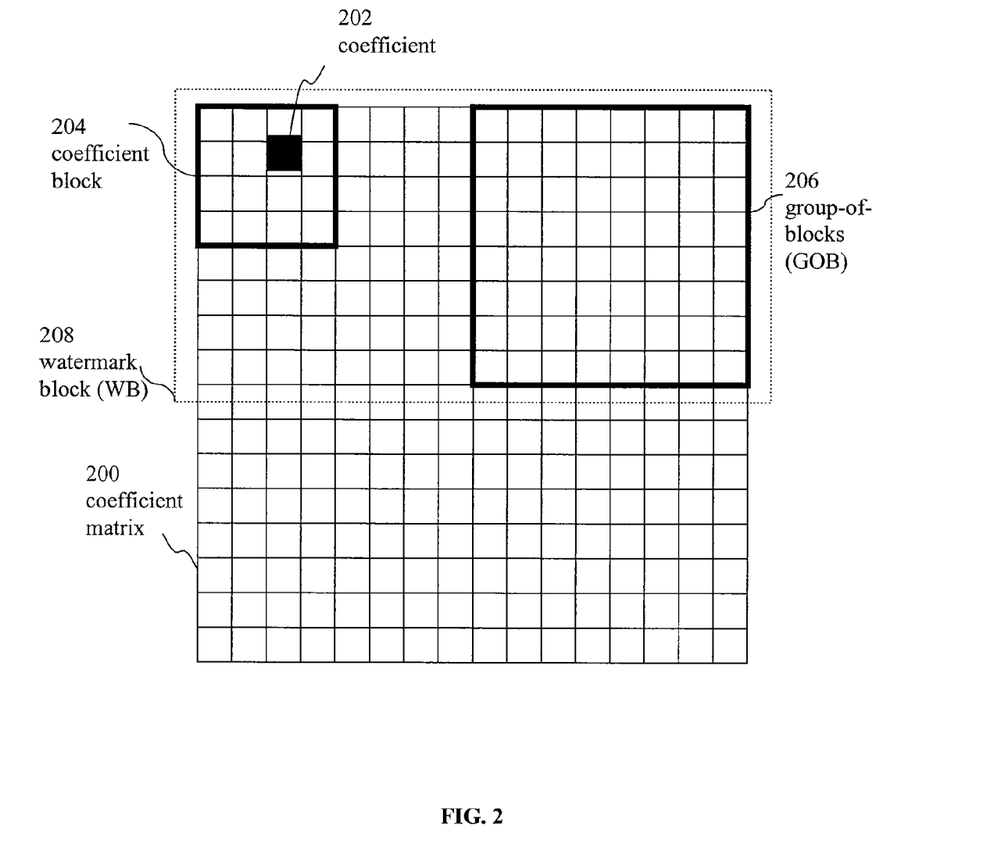
FIG. 2 shows a coefficient array representation of an image, according to an embodiment of the present invention.

FIG. 2 illustrates a coefficient matrix 200 according to an embodiment of the present invention. Coefficient matrix 200 comprises, for example, M×N coefficients, such as coefficient 202. For example, when an image is transformed using the DCT transform, then the coefficients are DCT coefficients. The M×N coefficients are logically partitioned to coefficient blocks (CB), such as, coefficient block 204 of a predetermined size, for example, 8×8 coefficients. The coefficient blocks of coefficient matrix 200 are logically grouped into group-of-blocks (GOB), such as, GOB 206. For example, four adjacent DCT blocks can be included in a corresponding GOB 206. The GOBs of coefficient matrix 200 are then grouped into watermark blocks (WB), such as, watermark block 208. The number of GOB in each watermark block 208 can depend on the characteristics of the watermark being embedded. The function and use of coefficients, coefficient blocks, group-of-blocks, and watermark blocks are explained below with respect to various processes.

Coefficients (e.g., 202) in a coefficient matrix (e.g., 200) can correspond to pixels in a digital image. For example, the DCT transformation assigns a value in the frequency domain for each group of one or more pixels in a digital image. One method of computing the DCT matrix of an image, the two-dimensional DCT, is described in Andrew B. Watson, "Image Compression Using the Discrete Cosine Transform," Mathematica Journal, v 4(1), p. 81-88 (1994), which is hereby incorporated by reference in its entirety.

In step 104, coefficient blocks (e.g., 204) of coefficient matrix (e.g., 200) are identified and a watermark-indicator is embedded in each coefficient block. For example, if a coefficient matrix is comprised of M×N coefficients, then logically partitioning it into 8×8 coefficient blocks will result in M/8×N/8 coefficient blocks. A watermark-indicator can be embedded in each of the M/8×N/8 coefficient blocks.

Figure 3:
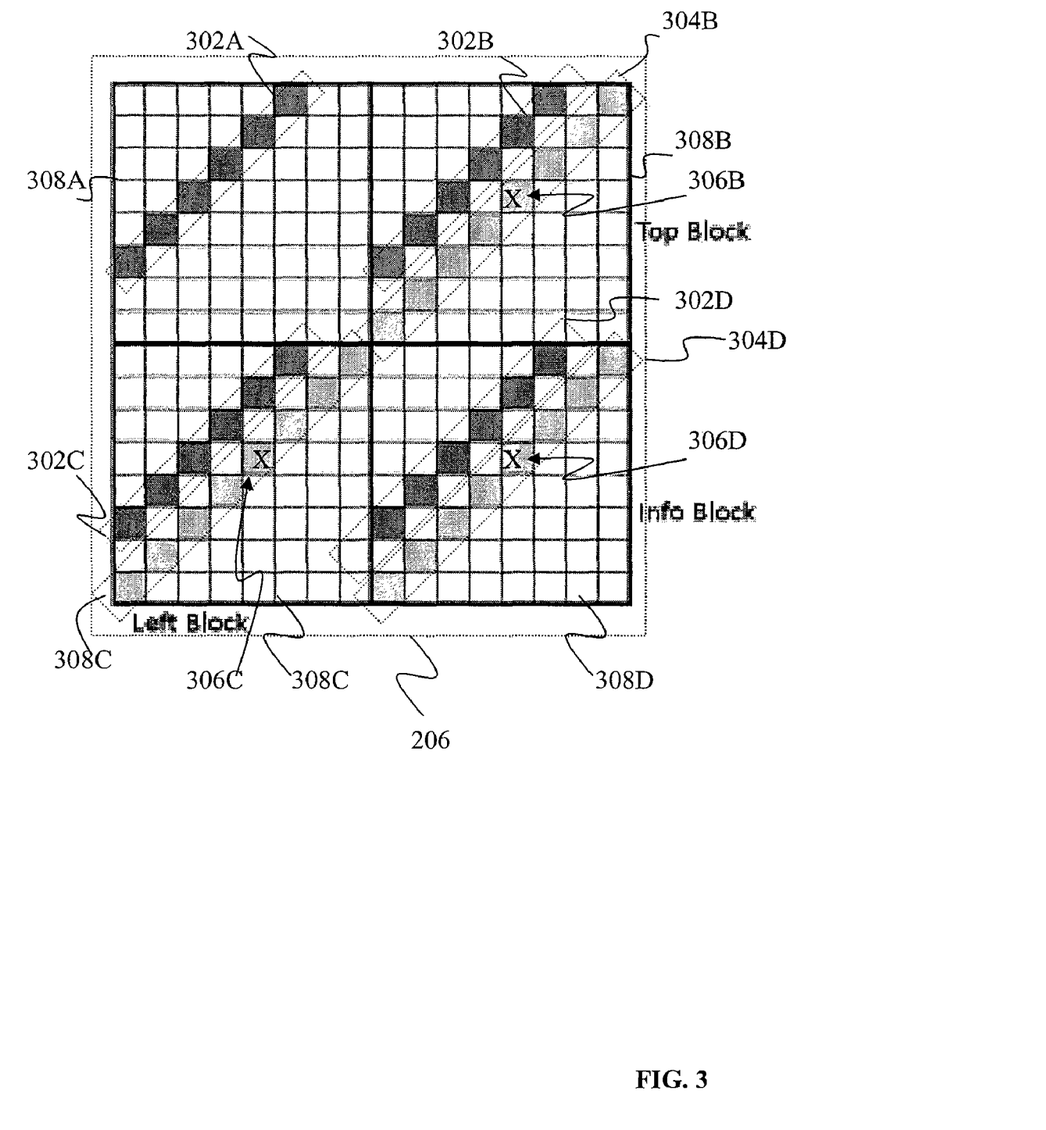
FIG. 3 shows example locations in an array representation of an image where watermark information can be embedded, according to an embodiment of the present invention.

A watermark-indicator can be embedded by replacing a predetermined set of coefficients in each coefficient block, referred to as a "watermark-indicator coefficient set", with another value. In one embodiment, in each coefficient block, coefficients of a predetermined diagonal of coefficients can be set to a new value to indicate the presence of a watermark in the image. For example, in GOB 206 as shown in FIG. 3, the diagonals 302A, 302B, 302C and 302D of respective coefficient blocks 308A, 308B, 308C, and 308D, can be chosen to embed the watermark-indicator. The coefficients in diagonal 302A, i.e., the watermark-indicator coefficient set corresponding to coefficient block 308A, can be set to the average value of the coefficients of that diagonal. Similarly, the coefficients of each of the diagonals corresponding to 302A in all other coefficient blocks in the coefficient matrix can be set to the average value of coefficients of the respective diagonal.

In the example above, the diagonal for embedding the watermark-indicator in each coefficient block is chosen because the coefficients in those diagonals, in the DCT transformation of an image, are representative of frequency components that are above the normal perception range and also substantially unaffected by JPEG compression. Other choices of coefficients for the watermark-indicator coefficient set in a similarly repetitive, easily determinable manner are possible and are contemplated within embodiments of the present invention. It should also be noted that the coefficients in the watermark-indicator coefficient set can be set to a value other than the average value.

The embedding of a watermark-indicator in a repetitive, easily determinable manner contributes to reduced execution times and robustness to cropping and compression that are characteristic of embodiments of the present invention.

In step 106, the GOB boundary is determined. In one embodiment, a GOB may contain 4 coefficient blocks arranged in a 2×2 coefficient block array, i.e., 2 rows and 2 columns of coefficient blocks in the coefficient matrix, for example, as shown in FIGS. 2 and 3. Other choices for the number and organization of the selected coefficient blocks that comprise a GOB are possible and are contemplated within the teachings in this disclosure.

In step 108, one coefficient block in the GOB is selected to be an "information block", and another two blocks within the GOB are selected to be "contributor blocks." The information block is a coefficient block that holds all or part of a watermark. The contributor blocks are other coefficient blocks in the same GOB as the corresponding information block that provides coefficient values based on which the watermark data is embedded in the information block. Coefficients in contributor blocks that are used for deriving the coefficient values for the watermark coefficient set can be referred to as the watermark contributor coefficient set. In one embodiment, in a GOB 206 of 2×2 coefficient blocks, coefficient block 308D is selected to be the information block, and coefficient blocks 308B and 308C are selected as contributor blocks. Contributor block 308B is referred to as the "top block", and contributor block 308C is referred to as "left block". The selected pattern is common for all GOBs of the coefficient matrix.

A predetermined number of coefficients are selected in the information block (referred to as a "watermark coefficient set") where their values will be modified to encode part of the chosen watermark. For example, in FIG. 3, the coefficient diagonal 304D can be selected to embed a part of the watermark. Other choices for the information block and contributor blocks, as well as for the number and organization of the watermark coefficient set are possible and are contemplated within the embodiments of the present invention.

In step 110, the number of GOB required for a WB is determined based on the watermark and the number of bits of the watermark to be embedded in each GOB. The predetermined watermark can be divided into one or more "watermark-units", and each watermark-unit can be embedded in a different GOB. For example, if the watermark is a 32-bit string and it is decided to embed 8 bits of the watermark in each GOB, 4 GOBs can constitute the corresponding WB. Each WB includes at least a sufficient number of GOBs to embed a complete instance of the selected watermark.

In step 112, the watermark can be defined to be robust even when in-order extraction is not guaranteed. For example, when a watermarked image has been cropped, it is likely that parts of the watermark are returned out of order in extracting the watermark from the watermarked image. Additional data, referred to as "sentinel-units", can be inserted at selected points between watermark-units of the predetermined watermark.

For example, consider a relatively large image that is likely to be cropped and in which a 32-bit watermark is to be embedded. If 4 bits are to be embedded in each GOB, a total of 8 GOBs are required to embed one instance of the entire 32-bit watermark. Therefore, the corresponding WB should include at least 8 GOB. In general, the 4-bit parts (i.e., the watermark-units) of the 32-bit watermark are embedded in order in the corresponding GOB. But, if the watermarked image is cropped, the order in which those 4-bit parts of the watermark are retrieved may not be the same as the order in which they were embedded. Therefore, sentinel-units may be interspersed at predetermined locations in the ordered sequence of watermark-units of the watermark. For example, 4 sentinel-units s1, s2, s3, s4 can be interspersed with the 8 watermark-unit sequence of {d1, d2, d3, d4, d5, d6, d7, d8} to have a total of 12 combined watermark-units and sentinel-units that constitute the processed watermark as follows: {s1, d1, d2, d3, s2, d4, d5, d6, s3, d7, d8, s4}. This processed sequence of watermark units, when embedded in a WB of 3×4 GOB array, can completely determine the order of the watermark units even when the extraction of the watermark units does not preserve ordering.

In step 114, the watermark, with or without being processed to preserve ordering in extraction, is embedded in the coefficient matrix. In one embodiment of the present invention, step 114, as illustrated in more detail in an example process in FIG. 4, can be used to embed the watermark in the coefficient matrix.

The value of a predetermined number of coefficients in diagonal 304D can be modified to embed each bit of the selected watermark. For example, coefficient 306D in coefficient diagonal 304D can be set to the average value of corresponding coefficients 306B in the top block and 306C in the left block, adjusted up or down by a predetermined constant value. If the corresponding bit of the watermark to be embedded is a 1, then the average value of the corresponding coefficients from the top block and the left block is incremented by a predetermined constant Q. If the bit to be embedded is a 0, then the average value of the corresponding coefficients from the top block and the left block is decremented by a predetermined constant Q.

Coefficients in diagonal 304D that are to have modified values (i.e., watermark coefficient set) to represent the embedded watermark are predetermined based on a random selection or based on some other criteria. In a DCT transform of a digital image, the coefficients in diagonal 304D represent frequency components that can generally be altered without substantially affecting the perceived image. Following the example above, any 4 coefficients in diagonal 304D can be used to embed a corresponding watermark-unit.

Similarly to embedding one watermark-unit in diagonal 304D of GOB 206, the process is repeated to embed the remaining watermark-units of that watermark instance in the other GOB of the WB such that an entire watermark instance is embedded in order in each WB of the coefficient matrix.

Figure 4:
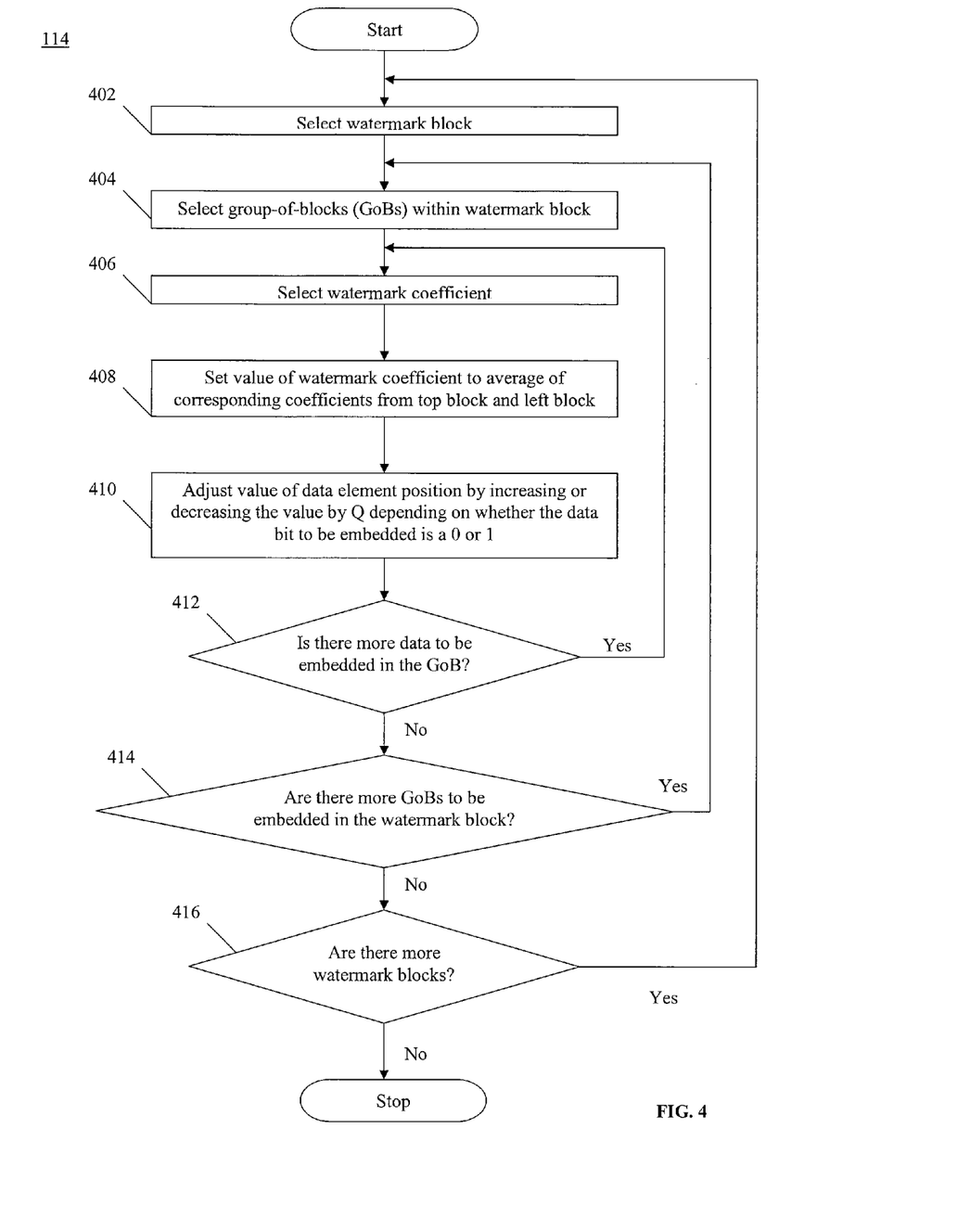
FIG. 4 shows a flowchart of a method of embedding watermarks in digital images, according to an embodiment of the present invention.

Returning to process 114 as shown in FIG. 4, a watermark can be embedded in a coefficient matrix as follows. In step 402, a WB is selected. In general, each WB can be processed in order of its placement within the corresponding coefficient matrix, for example, starting from the left edge of the coefficient matrix and moving across horizontally before moving to the next row of WB. In step 404, for each WB selected, a GOB within that WB is selected. The GOB in each instance can also be selected, for example, in order, starting from the left edge of the corresponding WB and moving across horizontally before moving to the next row of GOB of the WB.

In step 406, within the selected GOB, a coefficient is selected to be updated with a new value, modified according to the watermark data to be embedded. As described previously, the coefficients to be updated, i.e., the watermark coefficient set, can be predetermined.

In step 408, for one coefficient in the watermark coefficient set, the value is set to the average of the coefficients in the corresponding positions in the top block and the left block. Then, in step 410, for that coefficient in the watermark coefficient set, depending on whether the bit to be embedded is a 0 or a 1, the value is either decremented or incremented, respectively, by a predetermined constant Q.

In step 412, a determination is made as to whether more data for the watermark-unit being processed needs to be embedded. If yes, processing returns to step 406 to select the next coefficient to be modified in the current GOB. If no, and if, in step 414, it is found that more GOBs are to be processed in the current WB, processing returns to step 404 to select the next GOB and the next watermark-unit to be embedded. If no more GOBs are to be processed in the current WB and it is determined, in step 416, that there are more WBs to be processed, the processing moves to step 402 and selects the next WB to embed an instance of the watermark. If, in step 416, it is found that there are no more WB to be processed, then all WB available in the digital image have been processed to embed an instance of the watermark. At the completion of process 114, all watermark-units of a watermark instance are embedded in each WB of the coefficient matrix.

Figure 5:
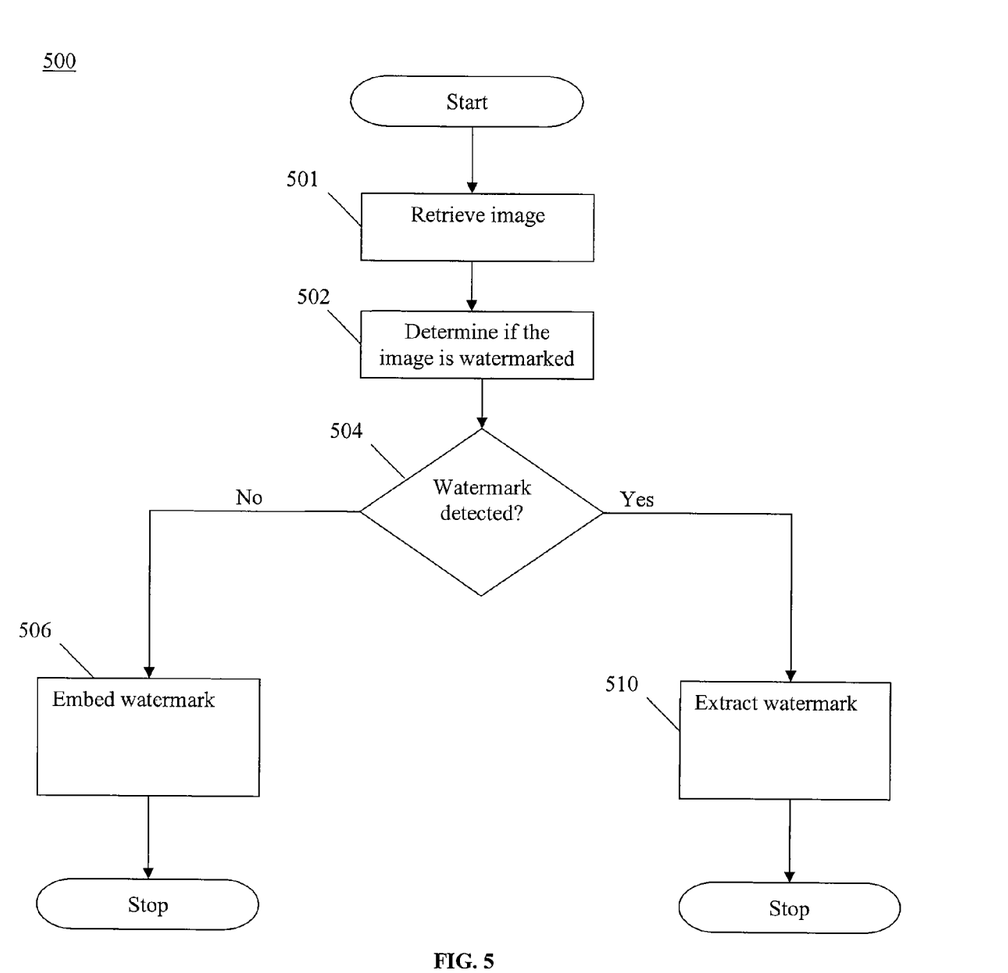
FIG. 5 shows a flowchart of a method to determine if a digital image contains a watermark, according to an embodiment of the present invention.

FIG. 5 illustrates a process 500 that can be used to determine if an image is watermarked, according to an embodiment of the present invention. If the image is found to be already watermarked, process 500 enables the watermark to be retrieved. If the image is found to not have a watermark, a watermark is embedded in the image.

In one example, process 500 may be part of a process that processes an entire set of images collected, for example, by a web crawler or other device and deposited in one or more storage areas accessible to process 500. In step 501, a digital image, for example, a digital image in JPEG format is retrieved, for example, from the WWW or other repository of images that is accessible to process 500.

In step 502, the digital image is processed to determine if it already has a watermark embedded. An exemplary method of determining if a watermark is already embedded is described below with respect to FIG. 6. In step 504, process 500 selects one of two branches of processing based on whether a watermark was detected in step 502. If a watermark is detected, then processing proceeds to step 510 to extract the watermark. An exemplary method to extract a watermark is described below with respect to FIG. 6. Otherwise, if no watermark is detected in step 502, processing proceeds to step 506 to embed a watermark. An exemplary process 100 that can be used to embed a watermark was described above with respect to FIG. 1.

Detecting a Watermark

Figure 6:
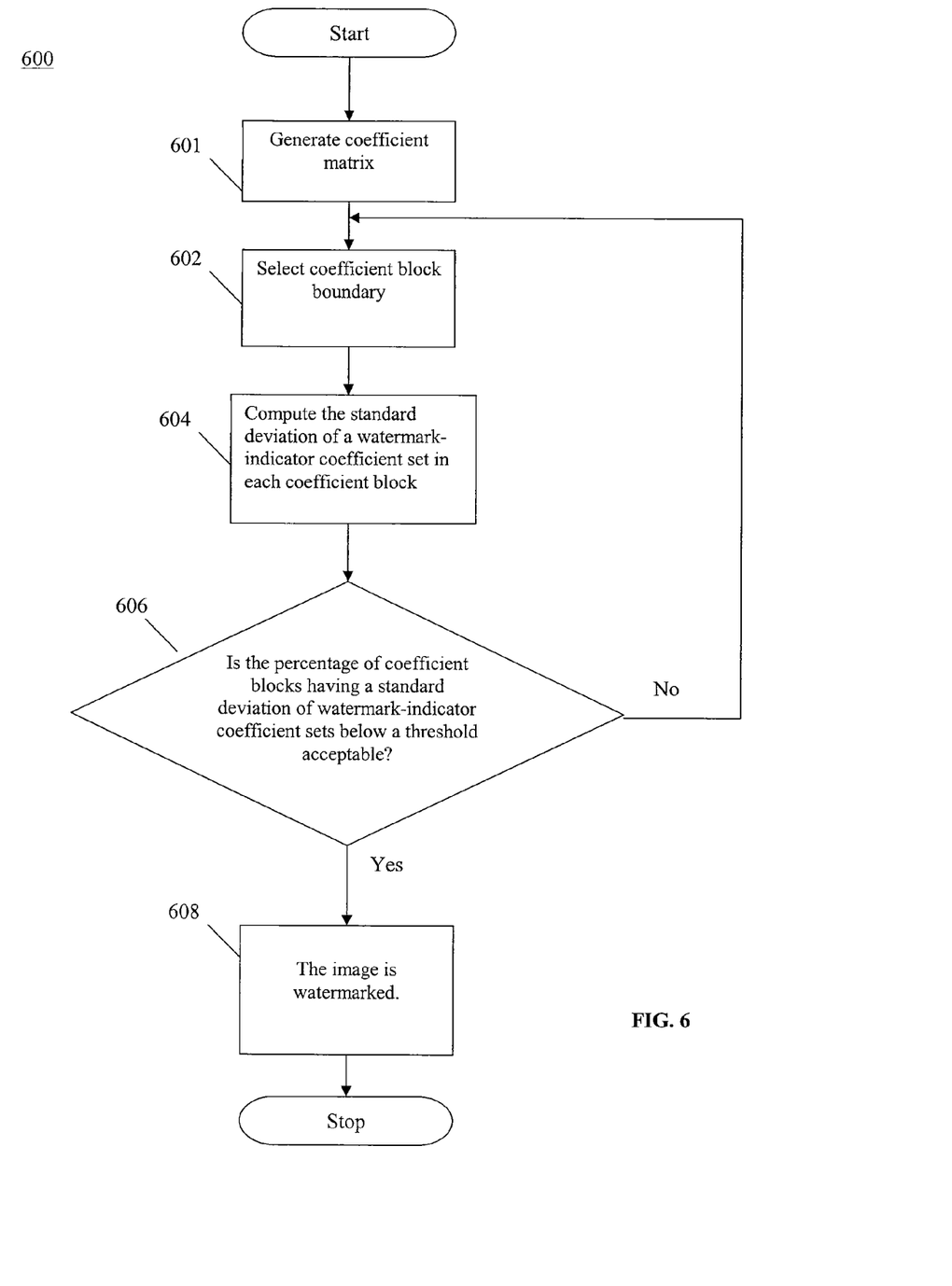
FIG. 6 illustrates a process for determining if an image is watermarked, according to an embodiment of the present invention.

FIG. 6 illustrates a process 600 to determine if an image includes a digital watermark, according to an embodiment of the present invention. In step 601, the image is transformed into a coefficient matrix as described previously. Step 601 is necessary only if the coefficient matrix has not been generated previously by another process or is not available to process 600. In step 602, a starting point is determined in a coefficient matrix representative of the digital image being processed. For example, process 600 may consider the coefficient at coefficient matrix location (0, 0) as the starting point: the first element in the tuple (0, 0) representing the row position of the coefficient in the coefficient matrix, and the second element representing the column position. Process 600 can commence processing by considering coefficient (0, 0) to be the upper left corner of a first coefficient block, for example, 8×8 coefficient block. Thus, in step 602, coefficient block boundaries are determined. The collection of all coefficient blocks based on such boundary determination can be referred to as a coefficient block distribution. The initial determination of a coefficient block distribution may also be considered a projected coefficient block distribution.

In step 604, based on the assumed coefficient block boundaries, i.e., a projected coefficient block distribution, the watermark-indicator coefficient set in each coefficient block is processed. For example, it may be predetermined that the diagonal of 6 elements corresponding to diagonal 302A shown in FIG. 3 would constitute the corresponding watermark-indicator coefficient set.

In each coefficient block, the standard deviation of the watermark-indicator coefficients set is calculated. For example, the standard deviation for all six elements of diagonal 302A is calculated in this step.

In step 606, the percentage of coefficient blocks in which the respective watermark-indicator coefficient sets have a standard deviation below a predetermined watermark-indicator threshold is determined. If the percentage thus determined is greater than the watermark-indicator threshold, in step 608, the image is determined to contain a watermark. Otherwise, further processing is required before a determination can be made that the image contains no watermark.

If the percentage of coefficient blocks determined in step 606 is less than the predetermined watermark-indicator threshold, then process 600 returns to step 602 and selects a new coefficient block boundary, i.e., a new projected coefficient block distribution.

Each time process 600 returns to step 602, the coefficient block boundary, specifically the top-left coefficient of the first coefficient block in the coefficient matrix, is moved in a manner to cover each coefficient in one coefficient block. For example, in this example, process 600 would return to step 602, each time moving the top-left coefficient of the coefficient block to the next element in a 8×8 array of coefficients anchored at the top left corner of the coefficient matrix. Thus, each projected coefficient block distribution is based on a new coefficient offset within a 8×8 array of coefficients. After a new coefficient block boundary is selected, the processing proceeds through steps 604-606. If, in one iteration, it is determined in step 606 that the percentage of coefficient blocks having a standard deviation of the watermark-indicator coefficient set that is less than a predetermined watermark-indicator threshold is greater than the desired percentage, then in step 608, it is determined that the corresponding image is watermarked.

On the other hand, if process 600 iterates through an entire coefficient block, for example, an entire 8×8 array of coefficients, without finding, in step 606, a percentage of coefficient blocks in which the standard deviation of the watermark-indicator coefficient set is below the predetermined watermark-indicator threshold, then it is concluded that the image is not watermarked. If it is determined that the image is not watermarked, for example, process 100 may be invoked to embed a watermark in the image.

Figure 7:
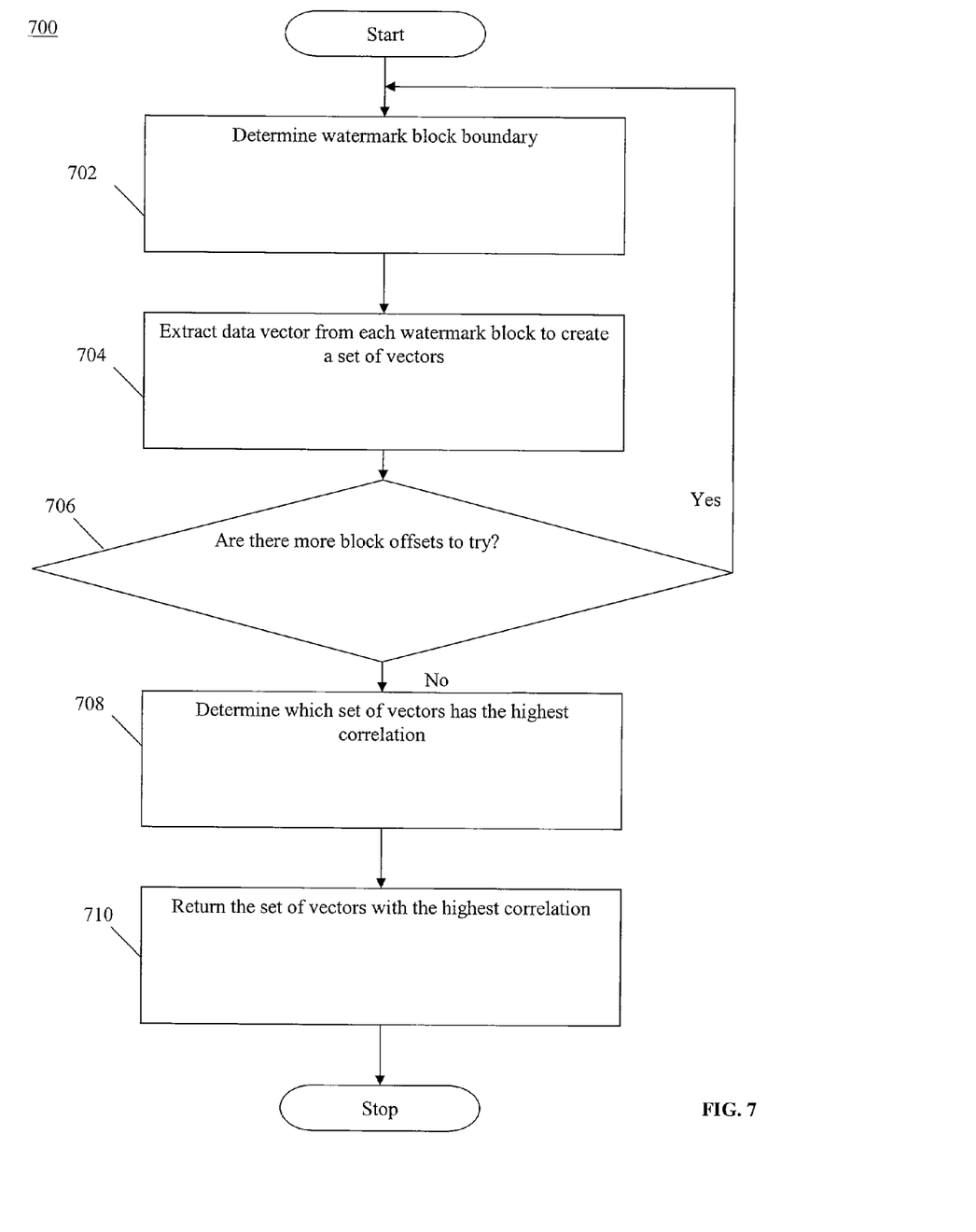
FIG. 7 illustrates a process for extracting an embedded watermark from an image, according to an embodiment of the present invention.

If it was determined, in step 606, that a percentage of DCT blocks in which the standard deviation of the watermark-indicator coefficients is above a predetermined watermark-indicator threshold, then it is concluded that the image is watermarked, and a process such as, for example, process 700 can be used to extract the watermark.

Various embodiments of the present invention are capable of determining whether a particular image contains a watermark in a relatively efficient manner. In a worst case scenario, the detection process iterates over each coefficient of an array the size of one coefficient block. Also, because the watermark is embedded in every coefficient block, the detection is remarkably robust even when the watermarked image is compressed or cropped.

Extracting a Watermark

FIG. 7 illustrates process 700 that can be used to extract a watermark from an image. The process of watermark extraction is based on determining a boundary for WB, i.e., a "watermark block distribution", and then determining the corresponding "watermark-unit vectors", i.e., vector of watermark-units of a watermark instance.

The size of the watermark, i.e., the length of the watermark, can be predetermined for each application. For example, where embodiments of this invention are applied to images posted in an ORKUT social networking site, the associated watermark embedding application and the watermark retrieving applications can be configured to use a watermark of a predetermined length based upon the requirements of the ORKUT application. For example, a 32-bit watermark may be sufficient to embed a determinative part of the user identifier associated with ORKUT. Similarly, the coefficient block size, GOB size, WB size, positions of watermark-indicator coefficients (watermark-indicator coefficient set), and positions of watermark coefficients (watermark coefficient set) can be known by process 700 when it begins to process an image to retrieve the embedded watermark.

By already having determined whether the image is watermarked using, for example, process 600, the coefficient block boundary in the coefficient matrix corresponding to the digital image being processed can be available to process 700. In step 702, a starting point for watermark determination and retrieval is determined. In one embodiment, the starting point for process 700 is selected as the coefficient block boundary, at the top left of the coefficient matrix, determined by a watermark detection process. For example, process 700 may consider the coefficient at coefficient matrix location 804 as the starting point: the first coefficient block in the first WB in the coefficient matrix. The size of the watermark, i.e., length of the watermark, can be predetermined for each application. Thus, in step 702 a WB boundary is determined. This can be considered a projected watermark block distribution.

Figure 8:
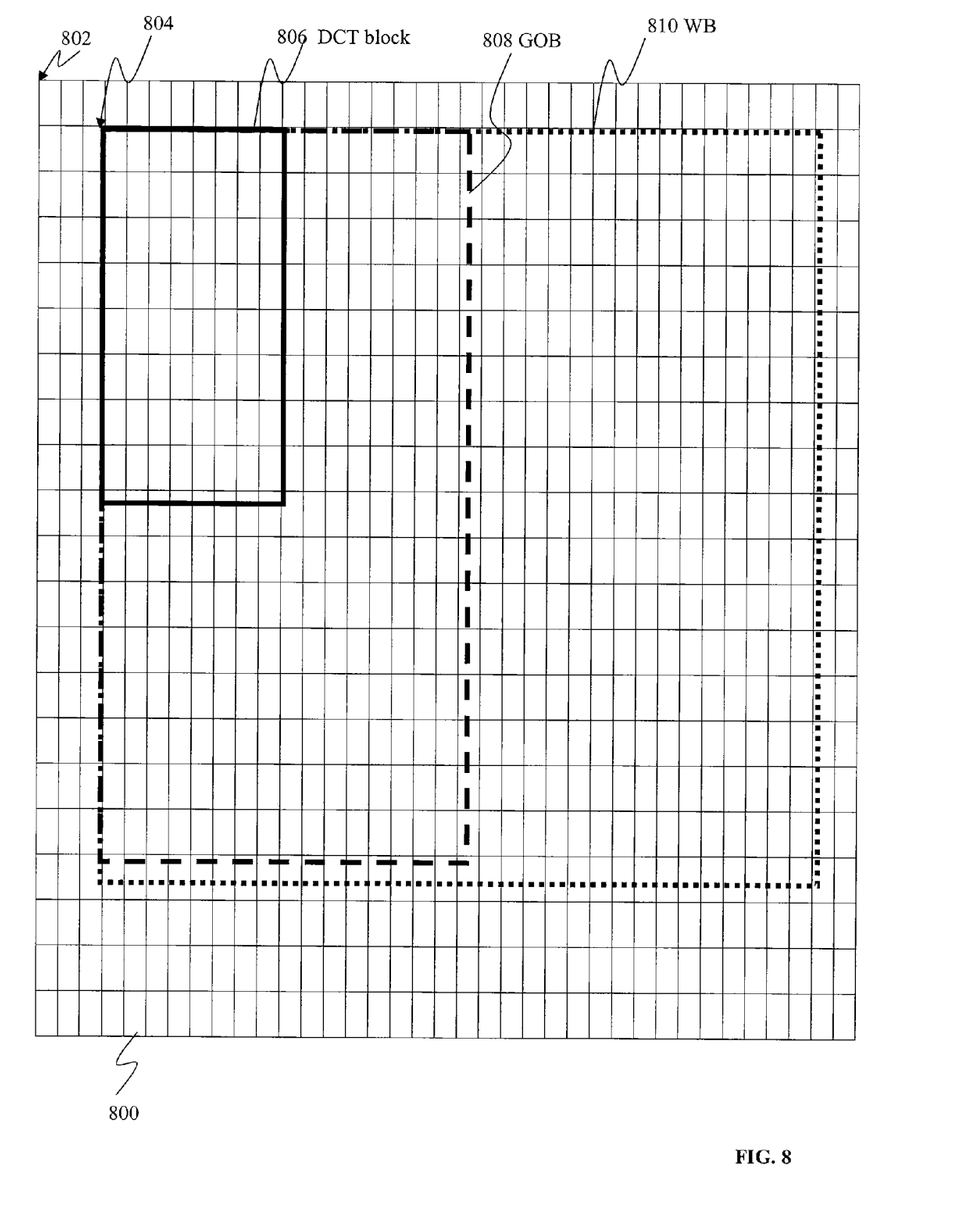
FIG. 8 illustrates aspects of processing in for extracting an embedded watermark from an image, according to an embodiment of the present invention.

In step 704, based on the currently assumed WB boundary, i.e., the current projected watermark block distribution, data vectors corresponding to the coefficients embedding watermark instance are retrieved from each WB in the image being processed. Based on the current projected watermark block distribution, respective GOB boundaries are determined. For example, in image 800 shown in FIG. 8, when process 700, in one projected watermark block distribution, assumes the WB boundary based on WB 810, the corresponding GOB boundaries can be determined including GOB 808.

From each WB in the projected watermark block distribution, a watermark-unit vector is generated, yielding a watermark-unit vector set for that projected watermark block distribution of the coefficient matrix. In step 706, it is determined whether process 700 should iterate over more coefficient block offsets, and if the answer is yes, process 700 returns to step 702. In one example, each coefficient block offset within a projected GOB can be tried in sequence.

Steps 702 and 704 are repeated for each projected watermark block distribution. Each projected watermark block distribution may be determined by considering a different coefficient block offset within the limits of one GOB.

In each GOB for the WB that is being currently processed of a projected watermark block distribution, each coefficient in the watermark coefficient set is compared against the average value of the corresponding coefficients in the contributor blocks, e.g., top block and the left block. If the coefficient in the watermark coefficient set is higher than the average value of the corresponding coefficients in the contributor blocks, then that coefficient can be considered to represent a '1' in the embedded watermark. If the coefficient in the watermark coefficient set is lower than the average value of the corresponding coefficients in the top block and the left block, then that coefficient can be considered to represent a '0'. The entire watermark-unit vector set for the image, for a projected watermark block distribution, can be generated by repeating this coefficient average comparison for each coefficient in the watermark coefficient set in each GOB of each WB according to the projected watermark block distribution.

In other embodiments, in step 706, steps 702-704 may be iterated based on a criteria other than coefficient block offsets in sequence, for example, coefficient block offsets may be tried in a random pattern, or other offsets based on row and column index can be used.

When, in step 706, it is determined that a sufficient number of watermark-unit vector sets have been generated, for example, when steps 702-704 has been iterated over all of the coefficient block offsets within a projected GOB, process 700 proceeds to step 708. In step 708, one of the sets of watermark-unit vectors is selected as representing the embedded data.

In one embodiment, the selection of one of the sets of watermark data as representing the embedded data may be based on a correlation metric computed for each set of watermark-unit vectors. A correlation metric can, for example, be based on the frequency of occurrence of a majority element. In one embodiment, for each GOB the most frequently occurring watermark-unit can be identified across all of the watermark-unit vectors in the corresponding set of watermark-unit vectors. The correlation metric for that set of watermark-unit vectors can be the number of occurrences of the most frequently occurring watermark-unit summed over all GOBs.

The method described above for determining a correlation metric based on the frequency of occurrence of watermark-units, has been observed to be remarkably resistant to many of the types of corruption observed in JPG images, such as, for example, corruption of selected localized areas. Other methods of determining a correlation metric are possible and are contemplated within the teachings of this disclosure. For example, a bit-by-bit correlation can be performed between all of the watermark-unit vectors in each set to arrive at a correlation metric value.

In step 710, the set of watermark-unit vectors with the highest correlation is determined to represent the embedded data. For example, the set of watermark-unit vectors having the highest correlation metric can be selected to represent the embedded data. The actual embedded watermark can then be determined from the set of vectors because each vector represents watermark coefficients in one WB. For example, a vector that matches most other vectors can be chosen, and its data units taken to represent the embedded watermark.

In cases, where the image was subjected to cropping, it is highly likely that the chosen vector does not have the watermark-units in proper order to represent the embedded watermark. If the watermark was embedded after having been processed for out-of-order extraction, for example, by inserting sentinel-units between the actual watermark-units (see, for example, the description of steps 110 and 112 of process 100 above) then using the sentinel-units that were inserted, the actual data units may be re-ordered to obtain the actual watermark. The ability to extract data units out of order and yet be able to determine the actual watermark is a key characteristic making the methods and systems disclosed herein robust to cropping.

Other Example Embodiments

In another embodiment, the watermark and the watermark-indicator can be embedded only in one or more selected areas of the image. In some applications, restricting the embedding of new data may improve the ability of the method to withstand corruption of the watermark, and to improve computational efficiency in embedding and extracting the data mark. For example, one or more of a set of predetermined hot-spots can be identified in each image to be watermarked. The watermark can be inserted only in those hot-spots. In one embodiment, a face detection or edge detection mechanism can be employed to detect faces or other more specific hot-spots, for example, eye, mouth, nose etc., and the watermark and watermark-indicator can be inserted in a region of the image covering the selected host-spots.

Figure 9:
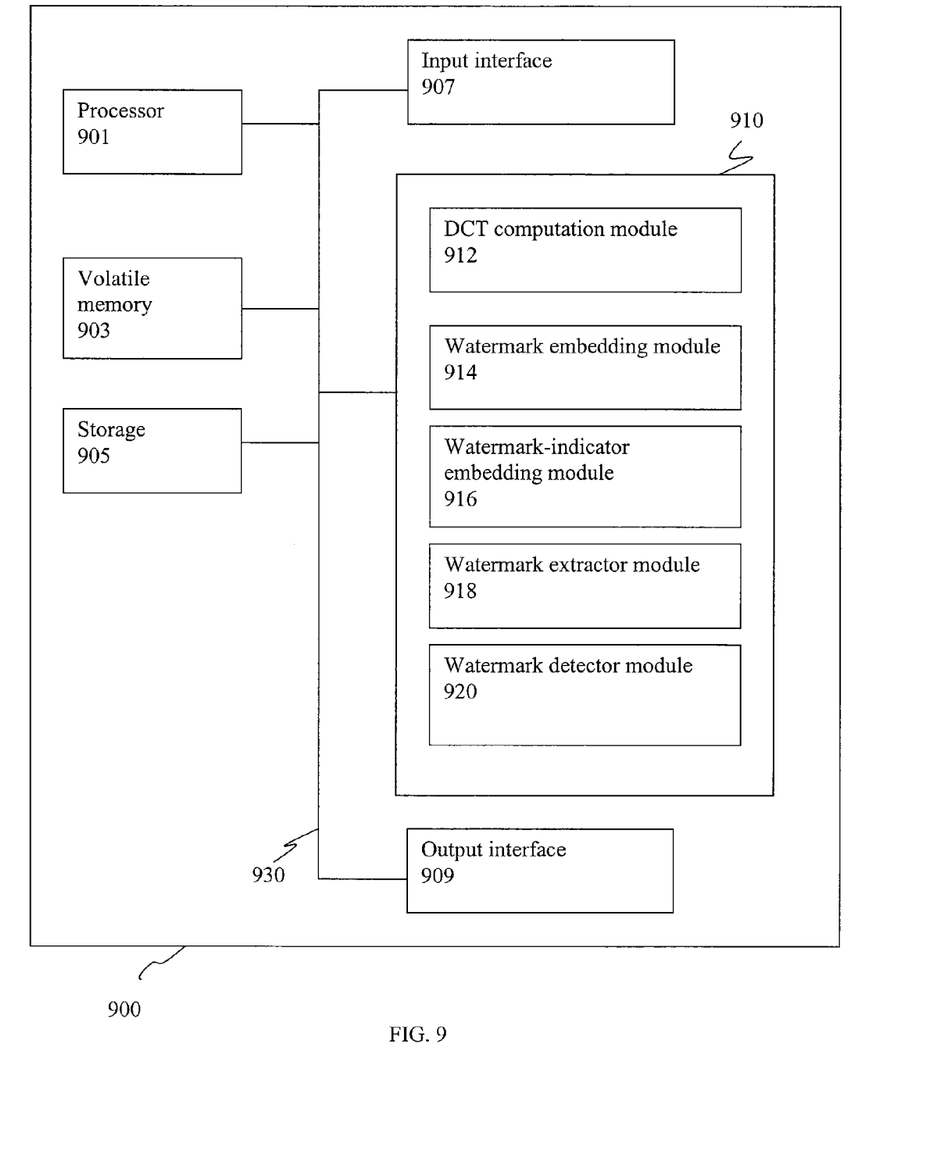
FIG. 9 is a system for watermarking images, according to an embodiment of the present invention.

FIG. 9 is an embedding system 900 to embed watermarks in images, to determine whether an image is watermarked, and/or to extract watermarks from images, according to an embodiment of the present invention. System 900 may be a general purpose or special-purpose computer including a processor 901, a memory 903, a storage 905, an input interface 907, an output interface 909, a communications device 930 and a watermarking module 910.

Processor 901 can include one or more microprocessors, digital signal processors (DSP), field programmable gate arrays (FPGA) or similar processing devices. Memory 903 can include a temporary digital memory device such as random access memory (RAM), and storage device 905 may include an persistent storage device such as, but not limited to, hard-disk, flash memory, or read only memory (ROM). Input interface 907 may include, but is not limited to, one or more of keyboard, mouse, pen-input device, connection to a network, or connection to an external device. Output device 909 may include, but is not limited to, one or more of a display, connection to a network, or other external device. Communication device 930 may include a communication bus such as, but not limited to a device compliant to the Peripheral Component Interconnect (PCI) standard or the Extended Industry Standard Architecture (EISA).

Watermark module 910 includes sub-modules implementing the functionality of embodiments of the present invention. Watermark module 910 includes a coefficient computation module 912, a watermark embedding module 914, a watermark-indicator embedding module 916, a watermark extractor module 918, and a watermark detector module 920. The functionality of each of these modules can be implemented in hardware, firmware, software, or using a combination thereof.

The functionality of these sub-modules can be implemented under the control of processor 901. For example, processor 901 can control the receiving of an image through input interface 907, the processing of that image using one or more modules in watermark module 910, and the outputting of the processed image through output interface 909. During the processing of images using watermark module 910, for example, the original image and the image being processed may reside in memory 903. Storage 905 may be used, for example, during the processing to store temporary information, or to store post-processing images and information. Modules 912-920 may also be implemented in a distributed manner on two or more interconnected computers.

Coefficient computation module 912 includes the functionality to transform an image, for example, an image in JPG format, into a coefficient representation in the frequency domain, e.g., to generate the coefficient matrix for an image. As described earlier, the coefficient matrix can be a DCT matrix corresponding to the DCT transformation of the image. Coefficient computation module 912 also includes the functionality to convert a coefficient matrix, before or after being processed according to an embodiment of this invention, back into an image format such as JPG. For example, coefficient computation module 912 can include capabilities to perform the inverse DCT transform. Coefficient computation module 912 can include all or part of the functionality described with respect to steps 102 and 116 of process 100. In one embodiment coefficient computation module 912 is configured to implement steps 102 and 116 of process 100 as described above.

Watermark embedding module 914 includes the functionality to embed a predetermined watermark in the coefficient matrix representation of an image. For example, watermark embedding module 914 can include all or part of the functionality described with respect to steps 106, 108, 110, 112, and 114 of process 100. In one embodiment watermark embedding module 914 is configured to implement steps 106, 108, 110, 112, and 114 of process 100 as described above.

Watermark-indicator embedding module 916 includes the functionality to embed a watermark-indicator in an image, according to an embodiment of the present invention. For example, watermark-indicator embedding module 916 can include functionality described with respect to step 104 of process 100. In one embodiment, watermark-indicator watermark-indicator embedding module 916 is configured to implement step 104 of process 100 as described above.

Watermark extractor module 918 includes the functionality to extract the embedded actual watermark from an image, according to an embodiment of the present invention. For example, watermark extractor module can include functionality described with respect to process 700. In one embodiment, watermark extractor module 918 is configured to implement steps 702-710 of process 700 as described above.

Watermark detector module 920 includes the functionality to detect the presence of a watermark in an image, according to an embodiment of the present invention. For example, watermark detector module 920, can process the image to discover the presence of a sufficient number of watermark-indicators. Watermark detector module 920 can include functionality described with respect to process 600. In one embodiment, watermark extractor module 920 is configured to implement steps 601-608 of process 600 as described above.

Figure 10:
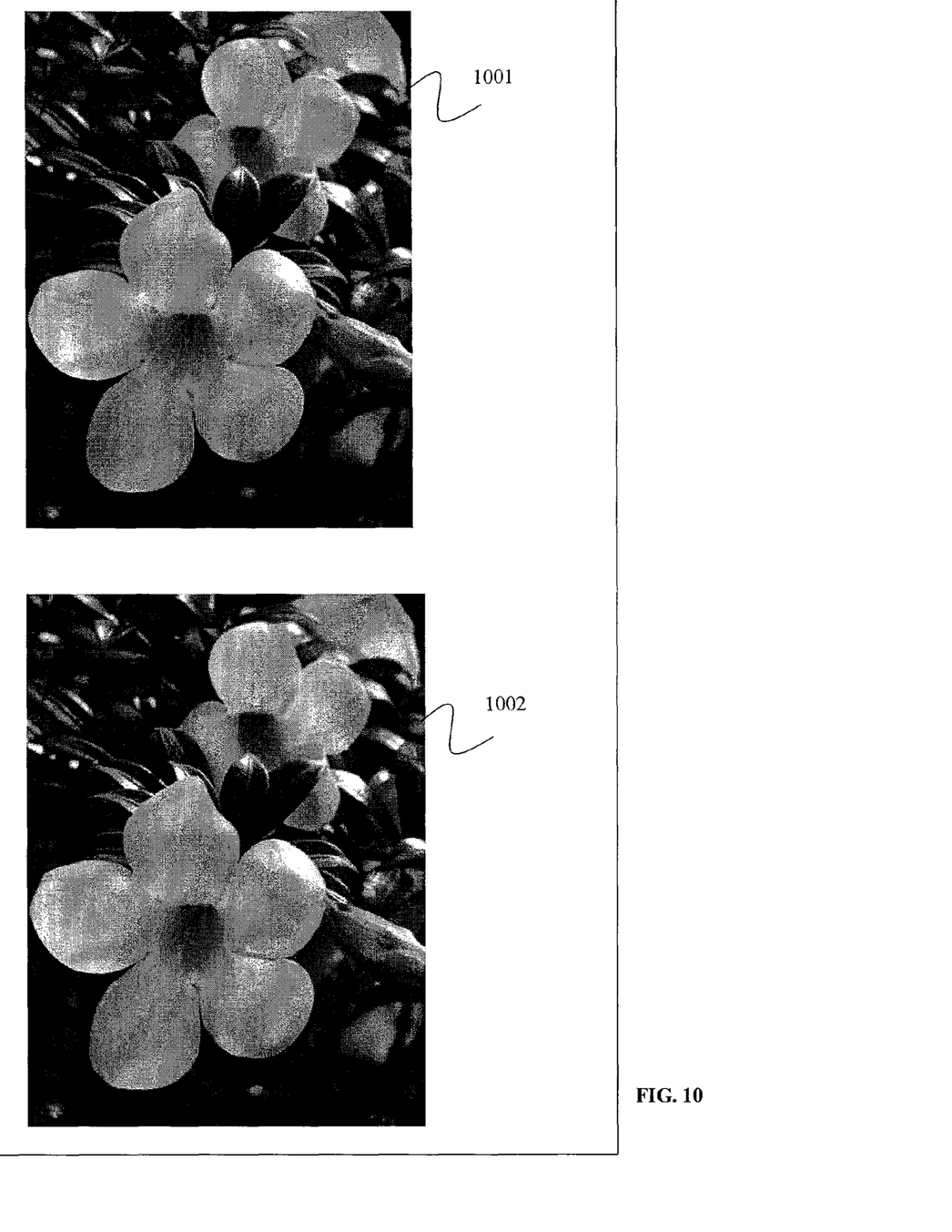
FIG. 10 shows an image before and after being watermarked, according to an embodiment of the invention.

FIG. 10 shows example images before and after processing according to an embodiment of the present invention. Image 1001 is an image before processing, and image 1002 is the same image 1001 after having been processed according to an embodiment of the present invention. In image 1002, a 32-bit watermark has been embedded in every 16×16 pixel area, and a watermark-indicator has been included in every 8×8 pixel area. A comparison of the two images shows that image 1002, which has a watermark embedded according to an embodiment of the present invention, has no perceivable difference from image 1001, i.e., the watermark is substantially invisible to the human eye.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of embedding information in a digital image to create a watermarked digital image, comprising:
   (a) transforming the digital image to a set of coefficient blocks having coefficients in a frequency domain;
   (b) embedding a watermark-indicator in each of a plurality of coefficient blocks of said set of coefficient blocks, wherein embedding the watermark-indicator includes modifying a watermark-indicator coefficients set such that a standard deviation of the watermark indicator coefficient set is below a predetermined watermark-indicator threshold;
   (c) embedding a watermark in each of a plurality of watermark blocks to generate a watermarked digital image, wherein each watermark block in the plurality of watermark blocks has a predetermined number of coefficient blocks from said set of coefficient blocks; and
   (d) outputting the watermarked digital image,
       wherein steps (a)-(d) are performed using at least one processor on the basis of instructions stored in at least one memory.

2. The method of claim 1, wherein each watermark block has a predetermined number of group-of-blocks, wherein each group-of-blocks has a predetermined number of coefficient blocks from the set of coefficient blocks, and wherein embedding a watermark, comprises:
   dividing the watermark into a plurality of watermark-units;
   selecting a watermark-unit from the plurality of watermark-units; and
   encoding the selected watermark-unit in a group-of-blocks in each watermark block.

3. The method of claim 2, wherein the encoding, comprises:
   selecting a watermark coefficient set in a group-of-blocks from said group-of-blocks in each watermark block; and
   modifying coefficients in the watermark coefficient set.

4. The method of claim 3, wherein the coefficients in the watermark coefficient set are selected from one coefficient block.

5. The method of claim 3, wherein the modifying coefficients in a predetermined watermark coefficient set comprises:
   selecting a watermark contributor coefficient set for the watermark coefficient set, wherein the watermark contributor coefficient set and the watermark coefficient set are located in one group-of-blocks; and
   calculating each coefficient in the watermark coefficient set based on the watermark contributor coefficient set.

6. The method of claim 5, wherein the watermark coefficient set is further modified according to the watermark-unit to be embedded.

7. The method of claim 2, wherein said each watermark-unit includes one or more sentinel-units, wherein the sentinel-units define an order of said each watermark-unit within the watermark.

8. The method of claim 1, wherein the transforming the digital image to a set of coefficient blocks, comprises:
   computing a discrete cosine transform (DCT) of the digital image; and
   representing the DCT of the digital image as a set of coefficient blocks.

9. A method of extracting a watermark from a digital image, the method performed on at least one processor, comprising:
   (a) transforming the digital image to a coefficient matrix having coefficients in a frequency domain;
   (b) determining if the digital image is watermarked based on a watermark-indicator coefficient set in each coefficient block in a projected coefficient block distribution, wherein the projected coefficient block distribution is based on a coefficient offset in the coefficient matrix; and
   (c) retrieving a watermark from a watermark block of a projected watermark block distribution, wherein the projected watermark block distribution is based on a block offset of the projected coefficient block distribution,
wherein steps (a)-(c) are performed using at least one processor on the basis of instructions stored in at least one memory.

10. The method of claim 9, wherein the determining if the digital image is watermarked comprises:
    (i) selecting a projected coefficient block offset in the coefficient matrix;
    (ii) determining a statistical measure based on a watermark-indicator coefficient set in each of a plurality of projected coefficient blocks in the coefficient matrix; and
    (iii) comparing the statistical measure to a predetermined threshold to determine if the digital image is watermarked.

11. The method of claim 10, wherein the statistical measure includes the standard deviation of coefficients in said watermark-indicator coefficient set.

12. The method of claim 10, further comprising:
    repeating steps (i), (ii), and (iii), changing the projected coefficient block offset, until one of:
       the digital image is determined to be watermarked in step (iii); or
       steps (i), (ii), and (iii) have been repeated for all said projected coefficient block offsets within an area of a coefficient block.

13. The method of claim 9, wherein the retrieving a watermark comprises:
    generating a plurality of projected watermark block distributions, wherein each said projected watermark block distribution is based on a different coefficient block offset;
    extracting a watermark-unit vector set from each projected watermark block distribution;
    selecting one of the extracted watermark-unit vector sets; and
    determining the watermark based the one selected watermark-unit vector set.

14. The method of claim 13, wherein the selecting one of the watermark-unit vector sets comprises:
    generating a correlation metric for each said watermark-unit vector set; and
    selecting the one said watermark-unit vector set based on the correlation metric.

15. A system for watermarking a digital image, comprising: at least one processor; an image transform module coupled to the at least one processor and configured to transform, using the at least one processor, the digital image to a plurality of coefficient blocks of coefficients in a frequency domain;
    a watermark embedding module coupled to the at least one processor and configured to embed, using the at least one processor, a watermark in each of a plurality of watermark blocks to generate a watermarked digital image, wherein each said watermark block comprises a predetermined second number of coefficient blocks; and
    a watermark-indicator embedding module coupled to the at least one processor and configured to embed, using the at least one processor, a watermark-indicator in each of a plurality of said coefficient blocks, wherein embedding the watermark-indicator includes modifying the watermark-indicator coefficients set such that a standard deviation of the watermark indicator coefficient set is below a predetermined watermark-indicator threshold.

16. A system for extracting a watermark from a digital image, comprising:
    at least one processor;
    an image transform module coupled to the at least one processor and configured to transform, using the at least one processor, the digital image to a plurality of coefficient blocks of coefficients in a frequency domain;
    a watermark-indicator detection module coupled to the at least one processor and configured to determine, using the at least one processor, if the digital image is watermarked based on a predetermined watermark-indicator coefficient set in each coefficient block in a projected coefficient block distribution; and
    a watermark extractor module coupled to the at least one processor and configured to retrieve, using the at least one processor, a watermark from a projected watermark block of a projected watermark block distribution, wherein the projected watermark block distribution is based on the projected coefficient block distribution.

17. A computer program product comprising a computer readable medium having computer program logic recorded thereon for causing at least one processor to embed a watermark in a digital image, said computer program logic comprising:
    first program logic that causes the at least one processor to transform the digital image to a plurality of coefficient blocks of coefficients in a frequency domain;
    second program logic that causes the at least one processor to embed a watermark in each of a plurality of watermark blocks to generate a watermarked digital image, wherein each said watermark block comprises a predetermined second number of coefficient blocks; and
    third program logic that causes the at least one processor to embed a watermark-indicator in each of a plurality of said coefficient blocks, wherein embedding the watermark-indicator includes modifying the watermark-indicator coefficients set such that a standard deviation of the watermark indicator coefficient set is below a predetermined watermark-indicator threshold.

18. A computer program product comprising a computer readable medium having computer program logic recorded thereon for causing at least one processor to extract a watermark from a digital image, said computer program logic comprising:

first program logic that causes the at least one processor to transform the digital image to a plurality of coefficient blocks of coefficients in a frequency domain;

second program logic that causes the at least one processor to determine if the digital image is watermarked based on a predetermined watermark-indicator coefficient set in each coefficient block in a projected coefficient block distribution; and third program logic that causes the at least one processor to retrieve a watermark from a projected watermark block of a projected watermark block distribution, wherein the projected watermark block distribution is based on the projected coefficient block distribution.

* * * * *